Patented May 1, 1928.

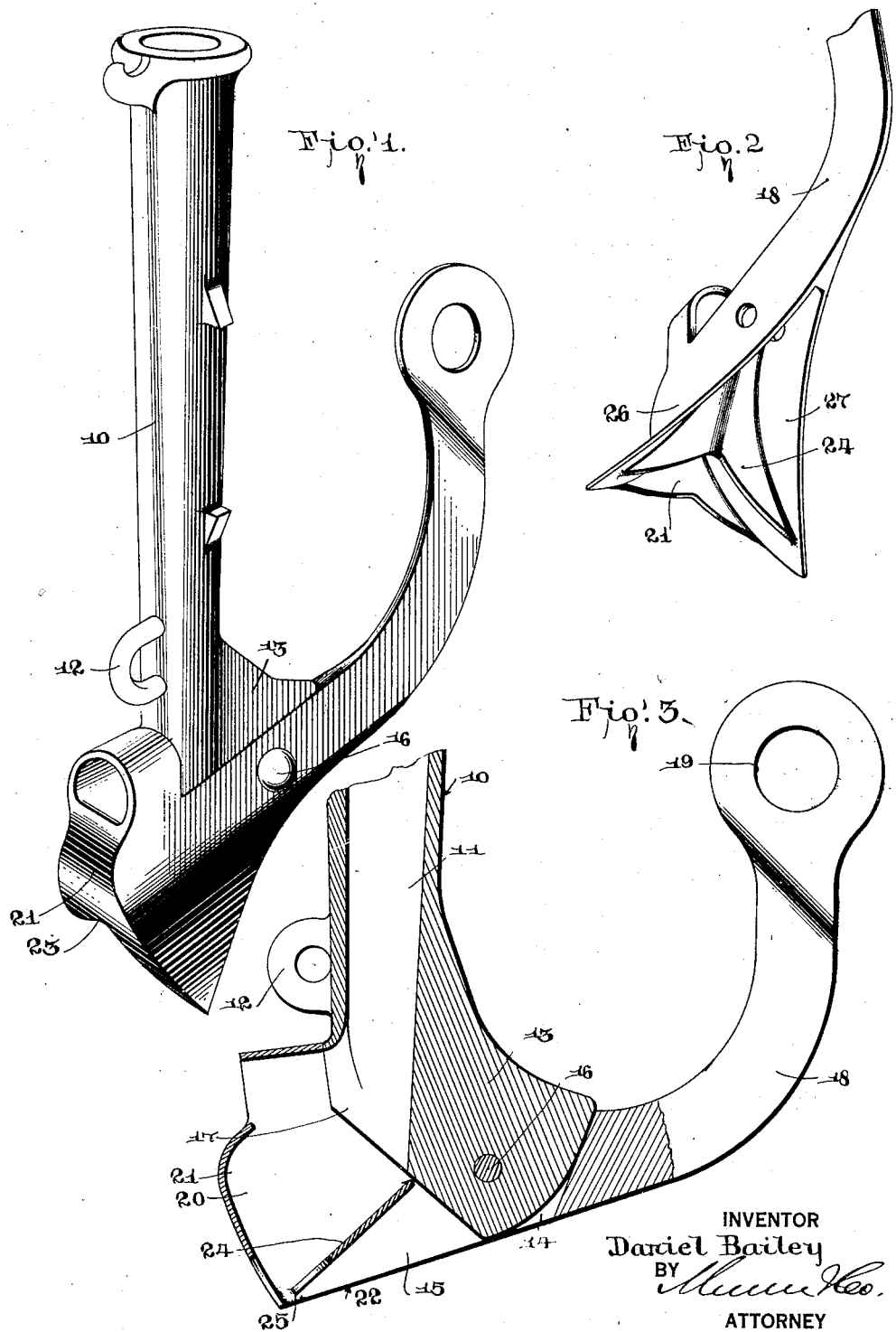

1,668,391

UNITED STATES PATENT OFFICE.

DANIEL BAILEY, OF TECUMSEH, MICHIGAN, ASSIGNOR OF ONE-HALF TO WILLIAM H. DAMON, OF TECUMSEH, MICHIGAN.

GRAIN SPREADER.

Application filed October 27, 1926. Serial No. 144,550.

This invention relates to an attachment for seeding machines and has for its object the provision of a device which is adapted to spread the grain when it is being delivered to the soil so that the seeds will not be crowded and thus cause inferior plants.

A further object of the invention is the provision of a device for distributing and spreading grain in the furrow of ground and which is adapted to replace the usual shoe fastened to the grain conductor of a seeding machine, the device being so constructed that it will deliver the grain over a width of three inches or more, thus giving to each seed a separate and detached space whereby each of the seeds will be given an opportunity to develop without the interference of the other seeds.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a view in perspective of a device constructed in accordance with the principles of my invention.

Figure 2 is a fragmentary view in perspective of the bottom of the spreader.

Figure 3 is a longitudinal vertical section of the same.

Referring more particularly to the drawings, 10 designates a chute having a passage 11 through which grains are adapted to be fed periodically to the shoe which ordinarily forms a part of the feeding attachment of a seeder. The lower end of the chute is provided with an extension 13 projecting into an opening 14 in a shoe 15 and riveted at 16 to said shoe with one or more rivets. The opening in the shoe through which the extension 13 and the lower end 17 of the chute is constructed is neatly adapted to receive the extension and the lower end of the chute so that the opening will be entirely closed.

The shoe itself consists of an arm 18 having an eye 19 adapted to be pivotally connected to the farming implement. The outer business end or operative end of the shoe is hollow as shown at 20 to provide a chamber into which the grain is to be dropped through chute 10.

The shoe at its rear end is closed as shown at 21 and has its lower effective end which is opposite the ground, open as shown at 22. The lower end of the closure 21 is bent inwardly, as at 23, in order to aid in separating the grain and distributing it into the furrow. A plate 24 of similar construction to the closure 21 is provided below the open end of the chute 10 and is adapted to receive the grain as the same is discharged from the chute and causes the grain to be deposited through the space 25. The members 21 and 24 may be welded integrally with the flared sides 26 and 27 of the shoe.

In the operation of my device the grain is discharged into the chute 10 in the normal way to the grain spreader or shoe from then it is deposited in the ground. In the present device, however, the grain is discharged from the lower end of the chute 10 onto the plate 24 whence it is permitted to pass through the opening 25 between the member 21 and the plate 24. The construction of the plate 21 and plate 24 is such that it not only spreads the grain out in spaced relation but acts in providing for a greater furrow in which the grain may be deposited. Furthermore a device for covering is not necessary in this case. The grain is automatically covered by the soil falling over it immediately after the shoe or spreader passes through the soil. The member 21 deflects the grain and causes said grain to pass through space 25 where it is being delivered to the soil.

What I claim is:

A device of the character described comprising a hollow shoe having flared side walls, a closure for the ends of the side walls, said closure having a groove running centrally thereof and forming an inwardly projecting rib the lower end of the closure having a V-shaped notch providing an opening, a spreader plate connected to the side walls and indented longitudinally thus dividing the plate into two inclined sections, said spreader plate having a V-shaped notch in the rear end and adjacent the V-shaped notch in the closure, a grain chute connected with the shoe and in open communication with the same, and means for rigidly supporting the shoe.

DANIEL BAILEY.